United States Patent
Huang

(10) Patent No.: US 11,250,257 B2
(45) Date of Patent: Feb. 15, 2022

(54) METHOD AND DEVICE FOR IRIS RECOGNITION

(71) Applicant: SHANGHAI HARVEST INTELLIGENCE TECHNOLOGY CO., LTD, Shanghai (CN)

(72) Inventor: Jiandong Huang, Shanghai (CN)

(*) Notice: Subject to any disclaimer, the term of this patent is extended or adjusted under 35 U.S.C. 154(b) by 58 days.

(21) Appl. No.: 16/607,093

(22) PCT Filed: Mar. 2, 2018

(86) PCT No.: PCT/CN2018/077876
§ 371 (c)(1),
(2) Date: Oct. 21, 2019

(87) PCT Pub. No.: WO2018/192308
PCT Pub. Date: Oct. 25, 2018

(65) Prior Publication Data
US 2020/0065578 A1    Feb. 27, 2020

(30) Foreign Application Priority Data
Apr. 20, 2017   (CN) .................... 201710260305.X

(51) Int. Cl.
*G06K 9/00*    (2006.01)
*H04N 5/33*    (2006.01)

(52) U.S. Cl.
CPC ..... *G06K 9/00604* (2013.01); *G06K 9/00617* (2013.01); *H04N 5/33* (2013.01)

(58) Field of Classification Search
CPC .......... G06K 9/00604; G06K 9/00617; H04N 5/225; H04N 5/33
See application file for complete search history.

(56) References Cited

U.S. PATENT DOCUMENTS

| | | | |
|---|---|---|---|
| 6,943,070 B2 | 9/2005 | Yang | |
| 2004/0125222 A1* | 7/2004 | Bradski | H01L 27/14652 348/272 |
| 2016/0266695 A1* | 9/2016 | Bae | G06F 3/04166 |
| 2017/0251366 A1* | 8/2017 | Perna | G06F 21/32 |
| 2017/0337442 A1* | 11/2017 | Um | G06K 9/00919 |
| 2018/0012007 A1* | 1/2018 | Kim | G06F 21/83 |

FOREIGN PATENT DOCUMENTS

CN    204808361    11/2015

* cited by examiner

*Primary Examiner* — Xin Jia

(57) ABSTRACT

The present invention provides a method and a device for iris recognition. By providing a sensing unit under the iris recognition region of the display unit, the invention can capture the iris information of the user's eyeball in time, and then compare with the presetting iris information, and execute the operation instruction corresponding to the iris information, thereby effectively improving the precision of the iris recognition. In addition, the sensing unit is disposed under the display unit, and the overall thickness of the mobile device can be effectively reduced compared with the structure in which the camera is protruded and disposed independently outside the region of the display screen, so that the wearable device or the mobile device is thinner and more suitable for flexible wearable devices or mobile devices, to meet the needs of the market.

20 Claims, 6 Drawing Sheets

METHOD AND DEVICE FOR IRIS RECOGNITION

FIELD OF THE DISCLOSURE

The present invention relates to the field of electronic device control, and in particular, to a method and a device for iris recognition.

BACKGROUND OF THE INVENTION

With development of science and technology and advances in technology, touch screen displays have been widely applied in devices with human-computer interaction interfaces, such as operating screens of industrial computers, touch screens of tablet computers and smartphones and the like. However, as far as wearable electronic devices are concerned, there is still much room for improvement in human-computer interaction interface technology. Taking virtual reality or augmented reality (VR/AR) devices as an example, the identity recognition method that conforms to the user's sensory experience is not as good as the biometric recognition technology of mobile devices, for example: fingerprint recognition technology. Identity recognition usually combines the user's biometric information with operational instructions to achieve such an operation through biometric identification, and iris recognition is an important one.

The iris is the texture of the muscle fiber tissue of the colored part of the human eyeball. The iris recognition refers to the iris feature information of the eyeball and recognizes it, predicts the user's identity status and needs, and responds to achieve the purpose of controlling the device by identifying the iris feature information. At present, the camera outside the screen of the mobile device is generally used to capture the feature changes of the eyeball, because the camera outside the screen of the mobile device is often independently disposed at the edge of the device (such as at the top of the mobile phone). In the application of wearable electronic devices, the optical axis of the eyeball image is deviated. The existing device structure cannot accurately capture the iris information of the user, and there are problems such as low recognition efficiency and poor recognition accuracy.

SUMMARY OF THE INVENTION

A technical problem to be solved by the present invention is to provide a technical solution for iris recognition to the problem such as iris feature information not completely captured, low recognition efficiency, and low recognition accuracy, and poor user's sensory experience. The problem mentioned above is caused by the camera outside the screen that deviates from the optical axis and the feature information of the user's iris cannot be accurately and timely captured.

In order to solve the above technical problem, the present invention adopts the following technical solution: a method for iris recognition, characterized in that, the method is applied to a device for iris recognition, the device comprising a display unit, a sensing unit, and an infrared light source; the display unit is provided with an iris recognition region, the sensing unit is located under the iris recognition region; the sensing unit includes an infrared sensing layer; the infrared light source is configured for emitting infrared light, and the infrared sensing layer is configured for sensing the infrared light signal reflected by an user's iris and capture iris information of the user; the method includes the following steps:

presetting operation configuration information, wherein the operation configuration information includes a correspondence between iris information and an operation instruction;

capturing the iris information of the user's iris recognition region, determining whether the captured iris information is successfully matched with the presetting iris information in the operation configuration information, and if yes executing the operation instruction corresponding to the iris information in the operation configuration information, otherwise not executing the operation instruction.

In addition, the step of "presetting operation configuration information" comprises:

receiving a setting instruction of the user and displaying the iris recognition region;

capturing and saving the iris information of the user;

displaying an operation instruction identification list, The operation instruction identification list includes one or more identifications corresponding to operation instructions, and each operation instruction identification corresponding to an operation instruction;

receiving a selected instruction of the operation instruction identification by the user, and establishing a correspondence between the operation instruction corresponding to the selected operation instruction identification and the captured iris information of the user, and saving the correspondence to the operation configuration information.

In addition, the operation instruction is a screen switching instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information of the user matches the iris information corresponding to the screen switching instruction, and if yes, switching the screen; otherwise, the screen is not switched.

In addition, the operation instruction is a payment instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information matches the iris information corresponding to the payment instruction, and if yes the payment is successful, otherwise the payment is failed.

In addition, the operation instruction is a user identity information login instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information matches the iris information corresponding to the screen switching instruction, if yes the user identity information is successfully logged in, otherwise the user identity information fails to be logged in.

In addition, the sensing unit includes a TFT image sensor array thin-film, the infrared sensing layer includes an array formed by infrared photodiodes and infrared photosensitive transistors.

In addition, the step of "determining whether the captured iris information is successfully matched with the presetting iris information in the operation configuration information" specifically includes:

calculating a feature value according to the captured iris information of the user, and compared with a feature value of the iris information presetting in the configuration information; when the error is less than the presetting value, it is determined to be matched, otherwise it is determined as a mismatch.

In addition, the method further includes the step of:

issuing a prompt information when it is determined that there is no iris information in the operation configuration information matching the captured iris information.

In addition, the prompt information includes one or more of sound prompt information, image prompt information, light prompt information, and video prompt information.

In addition, the display unit includes an AMOLED display screen or a LCD screen.

In addition, the display unit is the LCD screen, a backlight unit is further arranged under the sensing units; and the sensing units are arranged between the backlight unit and the LCD screen.

In addition, the iris recognition region includes a plurality of iris recognition sub-regions, and a sensing unit is disposed corresponding to each of the iris recognition sub-regions.

In addition, the device further includes a sensing unit control circuit, the method further includes:

receiving a start instruction of the user for the iris recognition sub-region, the sensing unit control circuit turning on the sensing unit under the iris recognition sub-region, and receiving a closing instruction of the user for the iris recognition sub-region, the sensing unit control circuit turning off the sensing unit under the iris recognition sub-region.

The inventor further provides a device for iris recognition. The device includes a display unit, a sensing unit, and an infrared light source; the display unit is provided with an iris recognition region, the sensing unit is located under the iris recognition region; the sensing unit includes an infrared sensing layer; the infrared light source is configured for emitting infrared light, and the infrared sensing layer is configured for sensing the infrared light signal reflected by an user's iris and capture iris information of the user; the device further includes an operation information setting unit, a determination unit, and a processing unit;

the operation information setting unit is configured for presetting operation configuration information, the operation configuration information includes a correspondence between the iris information and the operation instruction;

the sensing unit is configured for capturing the iris information of the user on the iris recognition region, the determination unit is configured for determining whether the captured iris information is successfully matched with the presetting iris information in the operation configuration information, and if yes the processing unit executes the operation instruction corresponding to the iris information, otherwise the processing unit does not execute the operation instruction.

In addition, the device further includes an operation instruction receiving unit, "the operation information setting unit is configured for presetting operation configuration information" includes:

the operation instruction receiving unit is configured for receiving a setting instruction of the user and the display unit is configured for displaying the iris recognition region;

the sensing unit is configured for capturing and saving the iris information of the user on the eyeball recognition region;

the display unit is configured for displaying an operation instruction identification list, the operation instruction identification list including one or more identifications corresponding to operation instructions, and each operation instruction identification corresponding to an operation instruction;

the operation instruction receiving unit is further configured for receiving a selected instruction of the operation instruction identification by the user, the processing unit is configured for establishing a correspondence between the operation instruction corresponding to the selected operation instruction identification and the captured iris information of the user, and saving the correspondence to the operation configuration information.

In addition, the operation instruction is a screen switching instruction, and "the determination unit is configured for determining whether the captured iris information is successfully matched with the presetting iris information in the operation configuration information, and if yes executing the operation instruction corresponding to the iris information, otherwise not executing the operation instruction" includes:

the determination unit is configured for determining whether the captured iris information of the user matches the iris information corresponding to the screen switching instruction, and if yes the determination unit switches the screen; otherwise the determination unit does not switch the screen.

In addition, the operation instruction is a payment instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes:

the determining unit is configured for determining whether the captured iris information matches the iris information corresponding to the payment instruction, and if yes the processing unit executes the payment instruction and the payment is successful, otherwise the processing unit does not execute the payment instruction and the payment is failed.

In addition, the operation instruction is a user identity information login instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes:

the determining unit is configured for determining whether the captured iris information matches the iris information corresponding to the screen switching instruction, if yes the processing unit executes the payment instruction and the user identity information is successfully logged in, otherwise the processing unit does not execute the payment instruction and the user identity information fails to be logged in.

In addition, the sensing unit includes a TFT image sensor array thin-film, the infrared sensing layer includes an array formed by infrared photodiodes and infrared photosensitive transistors.

In addition, "the determination unit is configured for determining whether the captured iris information is successfully matched with the presetting iris information in the operation configuration information" specifically includes:

the determining unit is configured for calculating the feature value according to the captured iris information of the user, and compared with the feature value of the iris information presetting in the configuration information; when the error is less than the presetting value, it is determined to be matched, otherwise it is determined as a mismatch.

In addition, the processing unit is configured for issuing a prompt information when it is determined that there is no iris information in the operation configuration information matching the captured iris information.

In addition, the prompt information includes one or more of sound prompt information, image prompt information, light prompt information, and video prompt information.

In addition, the display unit includes an AMOLED display screen or a LCD screen.

In addition, the display unit is the LCD screen, a backlight unit is further arranged under the sensing units; and the sensing units are arranged between the backlight unit and the LCD screen.

In addition, the iris recognition region includes a plurality of iris recognition sub-regions, and a sensing unit is disposed corresponding to each of the iris recognition sub-regions.

In addition, the device further includes a sensing unit control circuit and an operation instruction receiving unit, the operation instruction receiving unit is configured for receiving a start instruction of the user for the iris recognition sub-region, the sensing unit control circuit is configured for turning on the sensing unit under the iris recognition sub-region, and the operation instruction receiving unit is configured for receiving a closing instruction of the user for the iris recognition sub-region, the sensing unit control circuit is configured for turning off the sensing unit under the iris recognition sub-region.

The beneficial effects of the present invention after adopting the above technical solutions are as follows. By providing a sensing unit under the iris recognition region of the display unit, the projection of the user's iris image formed through the optical device is located on the iris recognition region, and the sensing unit is disposed at or near optical axis of the eyeball image. Compared with the structure in which the camera is disposed at the edge position independently of the display screen, the invention can timely capture the user's iris feature information and compare it with the presetting iris information, and execute the operation instruction corresponding to the iris information, thereby effectively improving the user experience. In addition, the sensing unit is disposed under the display unit, and the overall thickness of the mobile device can be effectively reduced compared with the structure in which the camera is protruded and disposed independently outside the region of the display screen, so that the wearable device or the mobile device is thinner and more suitable for flexible wearable devices or mobile devices, to meet the needs of the market.

DESCRIPTION OF THE PREFERRED EMBODIMENTS

Technical contents, structural features, implemented objectives and effects of the present invention will be described in detail below in combination with embodiments and with reference to the accompanying drawings.

Figure 1:
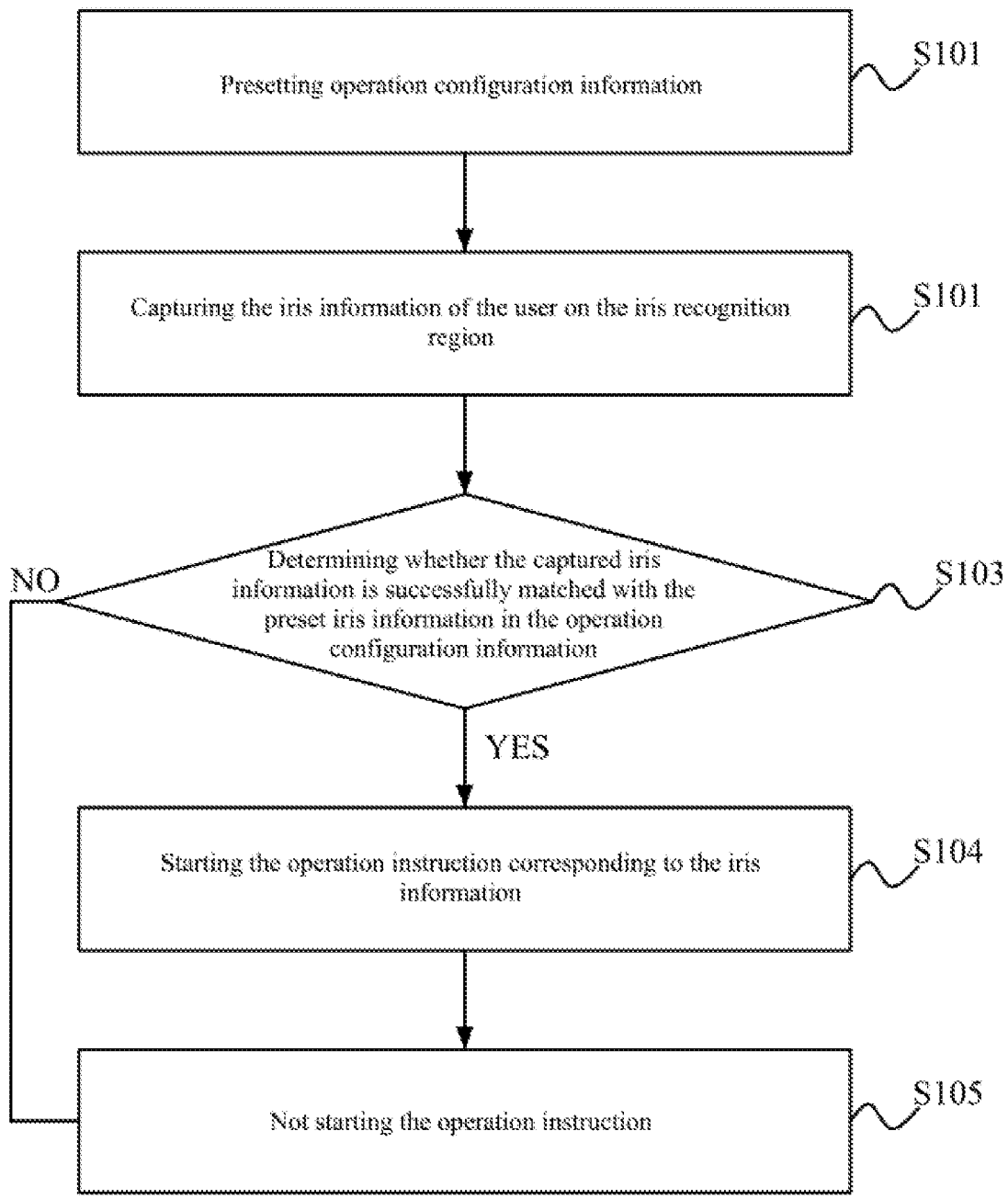
FIG. 1 is a flowchart of a method for iris recognition according to an embodiment of the present invention.
Figure 5:
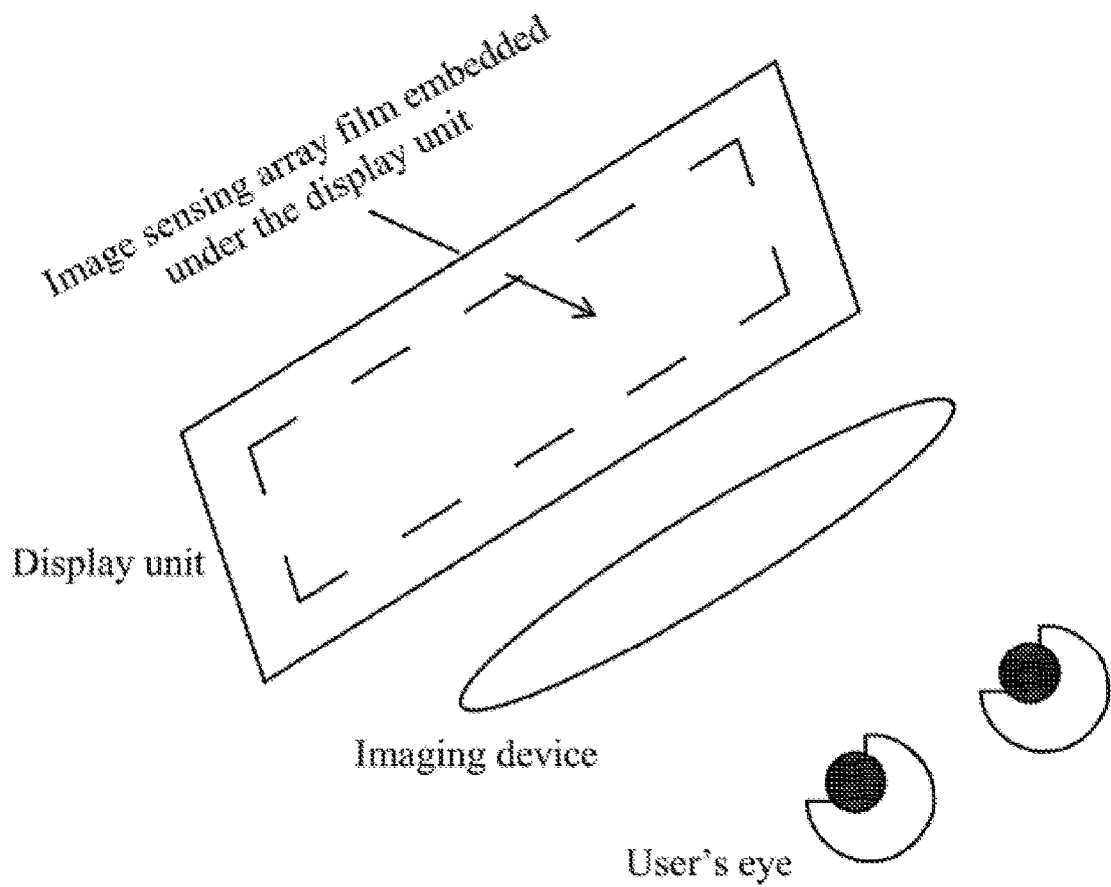
FIG. 5 is a schematic diagram of an application scenario of a device for iris recognition according to an embodiment of the present invention.

As seen from FIG. 1, it is a flowchart of a method for iris recognition according to an embodiment of the present invention. The method is applied to a device for iris recognition. The device is electronic equipment with a touch display screen, such as a mobile phone, a table computer, a personal digital assistant and other smart mobile equipment, and may also be a personal computer, a computer for industrial equipment or other electronic equipment. Of course, the device can also be combined with an optical imaging device which is disposed between the display unit and the user's eyes (i.e. above the display screen). As shown in FIG. 5, the user's eyeball projection is first imaged in the optical imaging device. The projection of the image is located in the range of the iris recognition region on the display unit and is captured by the sensing unit under the iris recognition region. The effect of simulating VR/AR device can be achieved by the cooperation between the optical imaging device and the display unit.

The device includes a display unit, a sensing unit and an infrared light source; the display unit is provided with an iris recognition area, the sensing unit is located under the iris recognition area, and the sensing unit includes an infrared sensing layer; The infrared light source is configured for emitting infrared light, and the infrared sensing layer is configured for sensing the infrared light signal reflected by the user's iris and capture the iris information of the user. In this embodiment, the display unit includes an AMOLED display or an LCD liquid crystal display; in other embodiments, the display unit may also be other electronic components having a display function. The infrared light source is an electronic device having a function of emitting infrared light, such as an infrared LED device. The method includes the following steps:

First, the process proceeds to step S101 of presetting operation configuration information, in which the mentioned operation configuration information includes a correspondence between the iris information and the operation instruction. In this embodiment, the operation instruction includes one or more of text operation instructions, image operation instructions, video operation instructions, and application operation instructions. The text operation instructions include a selected text instruction, a delete text instruction, a copy text instruction, and the like; the image operation instructions include a selected image instruction, a copy image instruction, a cut image instruction, an image deletion instruction, a switching image screen, and the like; the video operation instruction includes intercepting, pausing, saving, deleting, fast forwarding, rewinding, zooming, and volume adjustment, and the like; the application operation instructions include starting, deleting, selecting, moving, and the like of the software application (such as a mobile phone APP).

The iris information in the operation configuration information is the iris information that the user inputted and stored in advance, and each iris information can be matched with a plurality of operation instructions, so that after the captured iris information of the user is authenticated, the user can perform multiple operations on the device. The operation configuration information may be stored in a storage unit of the device, such as a memory of the mobile phone or a hard disk of the computer, and may also be stored in the storage unit of a server. When the operation configuration information needs to be captured, the device only needs to establish a communication connection with the server and then captures the prestored operation configuration information from the server. The communication connection includes a wired communication connection or a wireless communication connection.

Then, the process proceeds to a step S102 of capturing the iris information of the user on the iris recognition region. In this embodiment, the coverage of the sensing unit is matched to the size of the display unit. Preferably, the shape of the sensing unit is a rectangle, and the size of the rectangle is located at the center of the display unit, so as to ensure that the sensing unit is not deviated from the optical axis of the eyeball activity image. This ensures that as long as the user's eyes focus on the display unit, the sensing unit can accurately collect the user's iris information in time, no matter how the user's eyeball moves.

Then, the process proceeds to a step S103 of determining whether the captured iris information is successfully matched with the preset iris information in the operation configuration information, and if yes, proceeds to a step S104 of starting the operation instruction corresponding to the iris information, otherwise proceeds to a step S105 of not starting the operation instruction. Comparison of the iris information may be implemented by an iris feature recognition algorithm, which may be stored in the storage unit of the device. A processor of the device will take the iris feature recognition algorithms in the storage unit after the sensing unit captures the iris information on the iris recognition region, and compare the captured iris information with the preset iris information in the operation configuration information to determine whether the two are matched. The iris feature recognition algorithms include steps of iris feature preprocessing, data feature extraction, feature matching, iris recognition, etc., and may be implemented by various algorithms. These algorithms are mature existing arts, have been applied to various encryption and decryption fields, and are no longer repeated herein.

Figure 2:
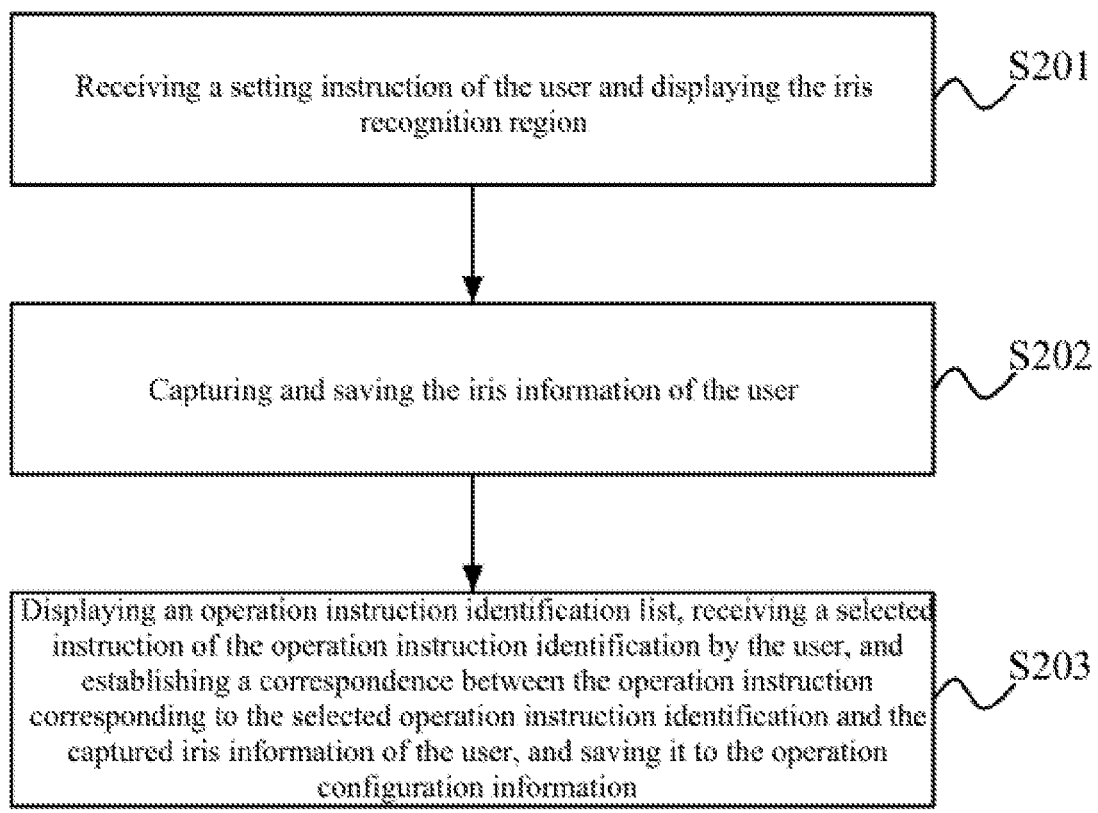
FIG. 2 is a flowchart of a method for iris recognition according to another embodiment of the present invention.

As seen from FIG. 2, it is a flowchart of a method for eyeball tracking operation according to another embodiment of the present invention. The step of "presetting operation configuration information" includes:

First, the process proceeds to a step S201 of receiving a setting instruction of the user and displaying the iris recognition region. The setting instruction may be triggered by clicking on a button in a setting column on the screen by the user. The device will display the iris recognition region after receiving the setting instruction so that the user can input the iris information. In the present embodiment, the step of displaying the iris recognition region may include: the brightness of the iris recognition region is enhanced or a prompt input box is displayed on the iris recognition region. In some embodiments, the method further includes a step of receiving account information of the user before receiving the setting instruction of the user, wherein the account information includes a user ID and a password. The setting instruction can be triggered only after the user inputs the correct user ID and password by voice control, eye control, or key password control to login a user account, so that the operation configuration information setting security can be improved on one hand, and an effect that different users can be distinguished and different iris information and the corresponding operation instruction can be saved on one device can be achieved on the other hand.

Then, the process proceeds to a step S202 of capturing and saving the iris information of the user. The captured iris information is preset iris information, which can be stored in the storage unit. In this embodiment, the step of "capturing and saving the iris information of the user on the eyeball recognition region" includes: determining whether the iris information in the user setting process has been saved in the storage unit, and prompting the user the iris information has been saved when the determination is yes; the iris information is saved to the storage unit when the determination is no. This can effectively avoid repeated storage of iris information.

Then, the process proceeds to step S203 of displaying an operation instruction identification list, receiving a selected instruction of the operation instruction identification by the user, and establishing a correspondence between the operation instruction corresponding to the selected operation instruction identification and the captured iris information of the user, and saving it to the operation configuration information. The operation instruction identification list includes one or more identifications corresponding to operation instructions, and each operation instruction identification corresponds to an operation instruction, and the operation instruction identification may be displayed in the form of a text or a picture. The selected instruction can be triggered by the user clicking a check, double clicking, or the like.

Figure 6:
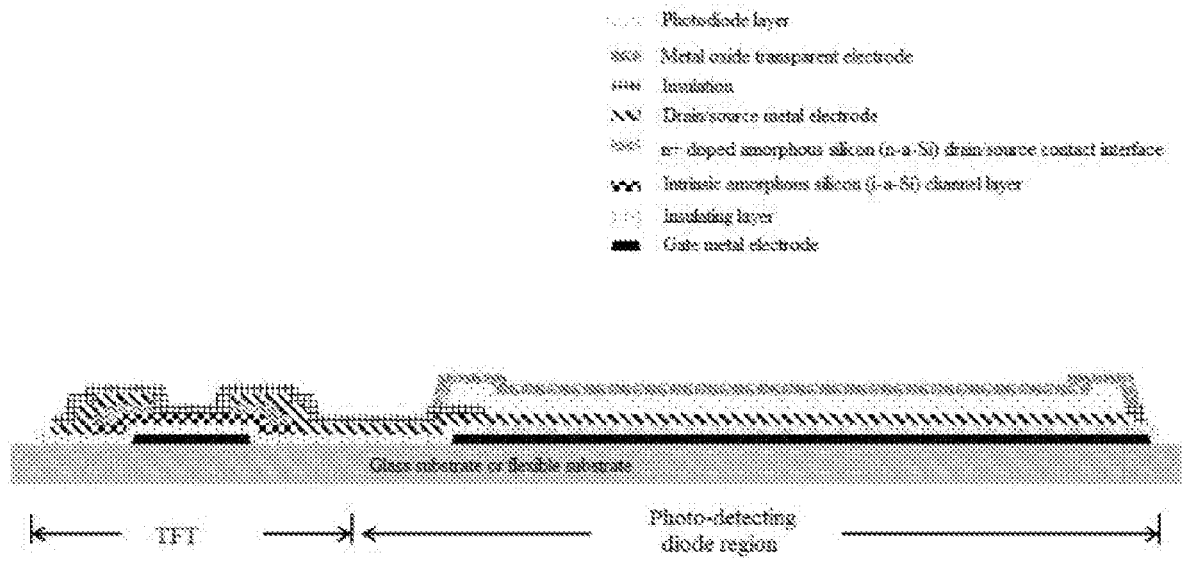
FIG. 6 is a schematic diagram of a conventional sensing unit.

As shown in FIG. 6, in the present embodiment, each sensing unit includes a TFT image sensing array film. An LCD screen or an OLED display screen is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 6). A specific structure may refer to descriptions on the structure of the sensing unit in a U.S. Pat. No. 6,943,070B2 and a PRC patent CN204808361U. A production process of the TFT image sensing array film is different from that of a TFT structure of the display screen in that an original pixel starting region of the display screen is changed to a photo-sensing in the production process. The TFT may be prepared by a method of using thin glass as a substrate or using a high temperature-resistant plastic material as the substrate, as described in the U.S. Pat. No. 6,943,070B2.

The sensing unit shown in FIG. 6 is susceptible to the reflection and refraction of surrounding ambient light or visible light emitted by the pixels of the display screen and other factors, causing optical interference and seriously affecting the signal-to-noise ratio (SNR) of the TFT image sensor array thin-film embedded under the display panel. In order to improve the SNR, a further improvement can be made on the sensing unit shown in FIG. 6, so that the TFT image sensor array thin-film can detect the infrared signal reflected by the user's eyeball. The sensing unit includes the infrared sensing layer, and the infrared sensing layer is configured to receive the infrared light signal reflected by the user's eyeball.

Figure 7:
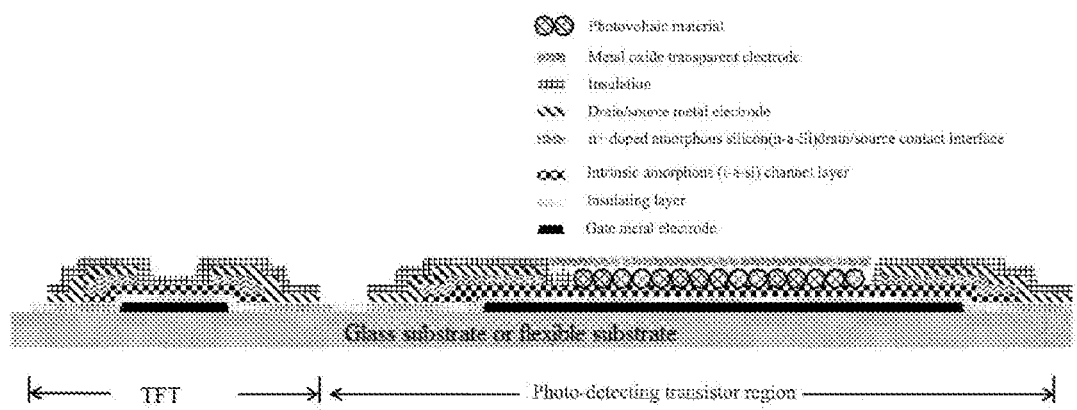
FIG. 7 is a schematic diagram of a sensing unit according to an embodiment of the present invention.

As shown in FIG. 7, in some embodiment, the infrared sensing layer is an array formed by infrared photosensitive transistor. In order to expand the wavelength of the optical signal that can be recognizable by the TFT image sensor array thin-film from the visible light range to the infrared light range, it is necessary to improve the TFT image sensor array thin-film shown in FIG. 6. Specifically, the TFT photovoltaic field effect transistor (PVFET) is used to replace the photodetection diode in the original array film, which can be referred to the document "Photovoltage field-effect transistors, Nature 542, 324-327 (16 Feb. 2017)". In this embodiment, the infrared sensing layer is also designed as a field effect transistor (Field Effect Transistor) structure, in order to prepare the transistor structure and being completely compatible with the TFT image sensor array thin-film shown in FIG. 6, the transistor structure can be manufactured as follows: preparing an amorphous silicon layer by chemical vapor deposition, preparing a metal layer and a transparent electrode layer by physical sputtering, and defining a lithographic shape layer required for each layer device by photomask lithography during preparation.

The potential difference between the drain and the source of the prepared infrared photosensitive transistor is an operating parameter for converting infrared light into an electrical signal. In order to achieve this, the gate of the infrared photosensitive transistor is made of a photovoltaic material sensitive to infrared light. For example, the photovoltaic material can be a quantum dot, carbon nano material, metal oxide film materials, or the like modified by bandgap engineering. These materials are mixed into an organic or inorganic compound and stirred into a colloidal or liquid state, and then a material as a gate electrode is prepared by coating, printing, or the like.

When the infrared light reflected back by the user's eye iris is incident on the array formed by the infrared photosensitive transistor, The electron hole pair (Electron-Hole Pair) excited by the photovoltaic material induces an electron channel between the drain and the source of the infrared photosensitive transistor, and the potential difference between the drain and the source is thus reduced, and the drain output current is increased by the TFT for scanning. The switching characteristic can realize the reading of the infrared light image electrical signal, thereby realizing the user. Capture of iris information. The TFT scans and drives the drain output current to rise. This switch characteristic can realize the reading of the infrared light image electrical signal, thereby realizing the capture of the user iris information.

Figure 8:
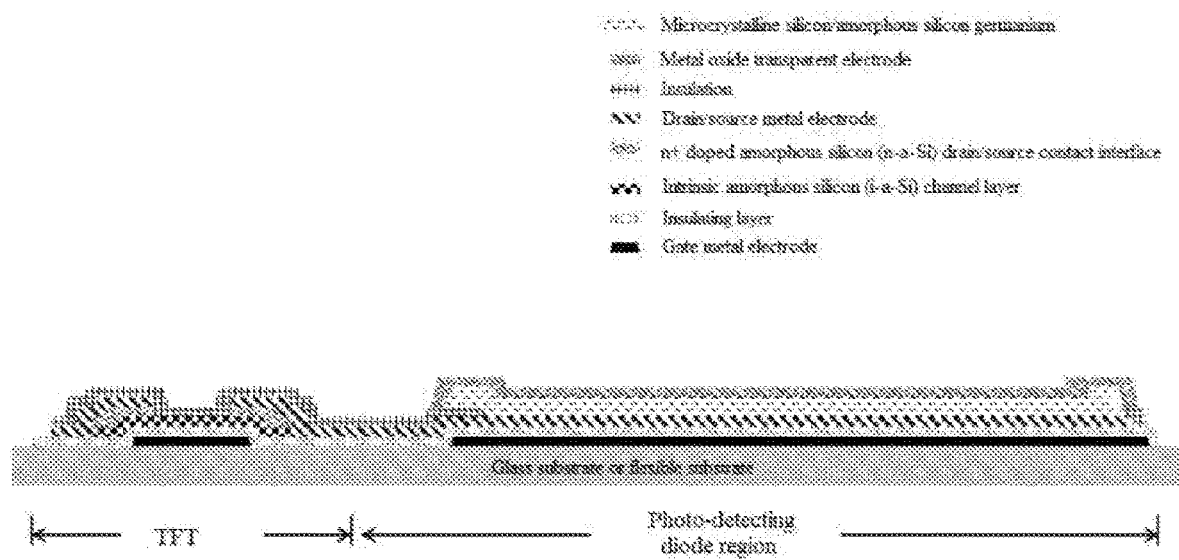
FIG. 8 is a schematic diagram of a sensing unit according to another embodiment of the present invention.

As shown in FIG. 8, the infrared sensing layer is an array formed by infrared photodiodes. In order to expand the wavelength of the optical signal that can be recognizable by the TFT image sensor array thin-film from the visible light range to the infrared light range and make the sensing unit can still capture the user's eyeball activity information when the display unit is a non-self-illuminating display screen (such as LCD display or electronic ink display), it is necessary to improve the TFT image sensor array thin-film shown in FIG. 6. The improvement is specifically to replace the photodiode layer of the TFT image sensor array thin-film shown in FIG. 6 by using an infrared photodiode, and the infrared photodiode includes a microcrystalline silicon photodiode or an amorphous silicon compound photodiode.

Embodiment 1: the amorphous silicon p-type/i-type/n-type photo diode structure (i.e., photodiode layer shown in FIG. 6) was changed to a microcrystalline silicon p-type/i-type/n-type photodiode structure. In this embodiment, the degree of micro-crystallization of the photodiode is mainly determined by mixing gaseous hydrogen silane (SiH4) with appropriate concentration of hydrogen to control the hydrogen bond to bind with the dangling bond of the amorphous silicon during the chemical vapor deposition process, so as to achieve the coating of microcrystalline silicon p-type/i-type/n-type photodiode structure. By adjusting the hydrogen concentration of chemical vapor deposition process, the operating wavelength range of the microcrystalline photodiode can be expanded to the light wavelength range of 600 nm to 1000 nm.

In the embodiment using the microcrystalline photodiode, in order to further improve the quantum efficiency of the photoelectric conversion, the microcrystalline silicon photodiode can also be formed by serially connecting double-junction or multi-junction p-type/i-type/n-type structures. The p-type/i-type/n-type material of the first junction layer of the photodiode is still an amorphous structure, and the p-type/i-type/n-type material of the second junction layer or the other junction layers may be a microcrystalline structure or a polycrystalline structure.

Embodiment 2: amorphous silicon p-type/i-type/n-type photodiode structure (photodiode layer in FIG. 5) is changed to a p-type/i-type/n-type photodiode structure doped with an amorphous silicon compound having an expandable photosensitive wavelength range. The amorphous silicon compound of a preferred embodiment is amorphous silicon germanium. In this embodiment, during the coating process of intrinsic layer (i type) of the photodiode by using chemical vapor deposition method, gas germane (GeH4) mixed with silane (SiH4) was introduced, so that the photosensitive range of the amorphous silicon germanium p-type/i type/n-type photodiode can reach a wavelength range of 600 nm to 1000 nm.

In the embodiment using the amorphous silicon compound photodiode, in order to improve the quantum efficiency of the photoelectric conversion, the amorphous silicon photodiode can also be formed by serially connecting double-junction or multi-junction p-type/i-type/n-type structures. The p-type/i-type/n-type material of the first junction layer of the photodiode is still an amorphous silicon structure, and the p-type/i-type/n-type material of the second junction layer or the other layers may be a microcrystalline structure, a polycrystalline structure, or a material doped with a compound having an expandable photosensitive wavelength range.

When the infrared sensing layer is an array formed by an infrared photosensitive diode, in actual application, a TFT can be used for scanning, driving, and adding a bias voltage between the p-type/i-type/n-type photodiodes, which will make the infrared photodiode in the state of detecting the infrared light signal, and the infrared light signal reflected back by the user's eye iris is converted into an infrared light image electrical signal and output, thereby realizing the capture of the user's eyeball activity information.

In some embodiments, the operation instruction is a screen switching instruction, and the step "determining whether the captured iris information is successfully matched with the presetting iris information in the operation configuration information, and if yes executing the operation instruction corresponding to the iris information, otherwise not executing the operation instruction" includes: determining whether the captured iris information of the user matches the iris information corresponding to the screen switching instruction, and if yes, switching the screen; otherwise, the screen is not switched. Since the video stream data is composed of a plurality of frames of image screens, the method of the embodiment is also applicable to determine the video stream data.

In some embodiments, the operation instruction is a payment instruction; the step "determining whether the captured iris information is successfully matched with the presetting iris information in the operation configuration information, and if yes executing the operation instruction corresponding to the iris information, otherwise not executing the operation instruction" includes: determining whether the captured iris information matches the iris information corresponding to the payment instruction, and if yes the payment is successful, otherwise the payment is failed. Linking the payment instruction with the user's iris information recognition can effectively enhance the security of the transaction payment, and avoid the owner's unnecessary losses caused by other users' maloperations.

In some embodiments, the operation instruction is a user identity information login instruction; the step of "determining whether the captured iris information is successfully matched with the presetting iris information in the operation configuration information, and if yes executing the operation instruction corresponding to the iris information, otherwise not executing the operation instruction" includes: determining whether the captured iris information matches the iris information corresponding to the screen switching instruction, if yes the user identity information is successfully logged in, otherwise the user identity information fails to be logged in. Linking the user identity information to the user's iris information recognition can effectively enhance the security of the user identity login process.

In some embodiments, the step of "determining whether the captured iris information is successfully matched with the presetting iris information in the operation configuration information" specifically includes: calculating the feature value according to the captured iris information of the user, and compared with the feature value of the iris information presetting in the configuration information; when the error is less than the presetting value, it is determined to be matched, otherwise it is determined as a mismatch.

In some embodiments, the method further includes the step of: issuing a prompt information when it is determined that there is no iris information in the operation configuration information matching the captured iris information. The prompt information includes one or more of sound prompt information, image prompt information, light prompt information, and video prompt information. The sound prompt information includes voice prompt information prompting the user that the iris recognition is failed, the image prompt information includes popup prompt information prompting the user that the iris recognition is failed, and the video prompt information includes the prompt information prompting the user that the iris recognition is failed. The light prompt information includes changing the brightness of the screen or letting the display screen emit light of different colors.

Figure 4:
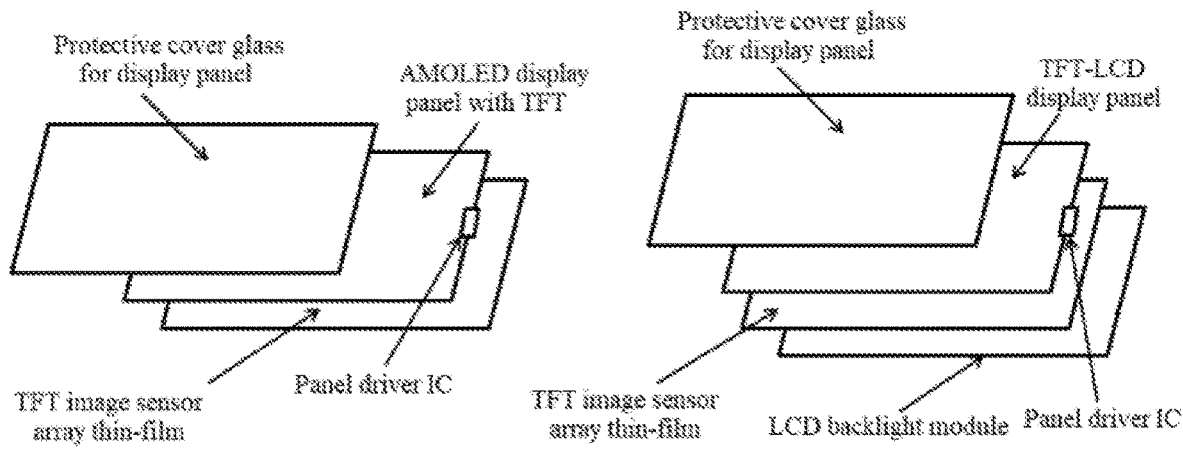
FIG. 4 is a schematic diagram of a device for iris recognition according to another embodiment of the present invention.

As shown in FIG. 4, in some embodiments, the display unit is the LCD screen, a backlight unit is further arranged under the sensing units; and the sensing units are arranged between the backlight unit and the LCD screen. Since the LCD screen is not a self-illuminating component, the backlight unit needs to be added under the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be expanded.

In the embodiment, the iris recognition region includes a plurality of iris recognition sub-regions, and a sensing unit is disposed corresponding to each of the iris recognition sub-regions. The device further includes a sensing unit control circuit, the method further including: receiving a start instruction of the user for the iris recognition sub-region, the sensing unit control circuit turning on the sensing unit under the iris recognition sub-region, and receiving a closing instruction of the user for the iris recognition sub-region, the sensing unit control circuit turns off the sensing unit under the iris recognition sub-region.

Taking the number of eye activity recognition sub-regions as two as an example, the two iris recognition sub-regions may be evenly distributed on the screen, one is up and one is down, or one is left and one is right, or may be distributed in the screen in other arrangements. The following is a detailed description of the application process of the device having two iris recognition sub-regions: in the process of using, the user sets the two iris recognition sub-regions to the on state by the start instruction. In the preferred embodiment, the range of the two iris recognition sub-regions covers the entire display screen, so that when both iris recognition sub-regions are set to the on state, the projection of the user's eyeball image is always within the range of the sensing unit, effectively improving the capture of the user's eyeball features to enhance the user experience. In other embodiments, the range of the two iris recognition sub-regions may also occupy ⅔, ¾, etc. of the entire display screen region, and only needs to satisfy the condition that the center of the iris recognition sub-region is not deviated from the optical axis of the eyeball image. Of course, the user can also set one iris recognition sub-region to be turned on and the other iris recognition sub-region to be turned off according to his or her preference. It is also possible to set both recognition sub-regions to the off state when no operation is required on the device.

In other embodiments, the number of iris recognition sub-regions may also be other values, which may be set according to actual needs. The sensing unit under each iris recognition sub-region can be set to be turned on or off according to the user's own preferences.

Figure 3:
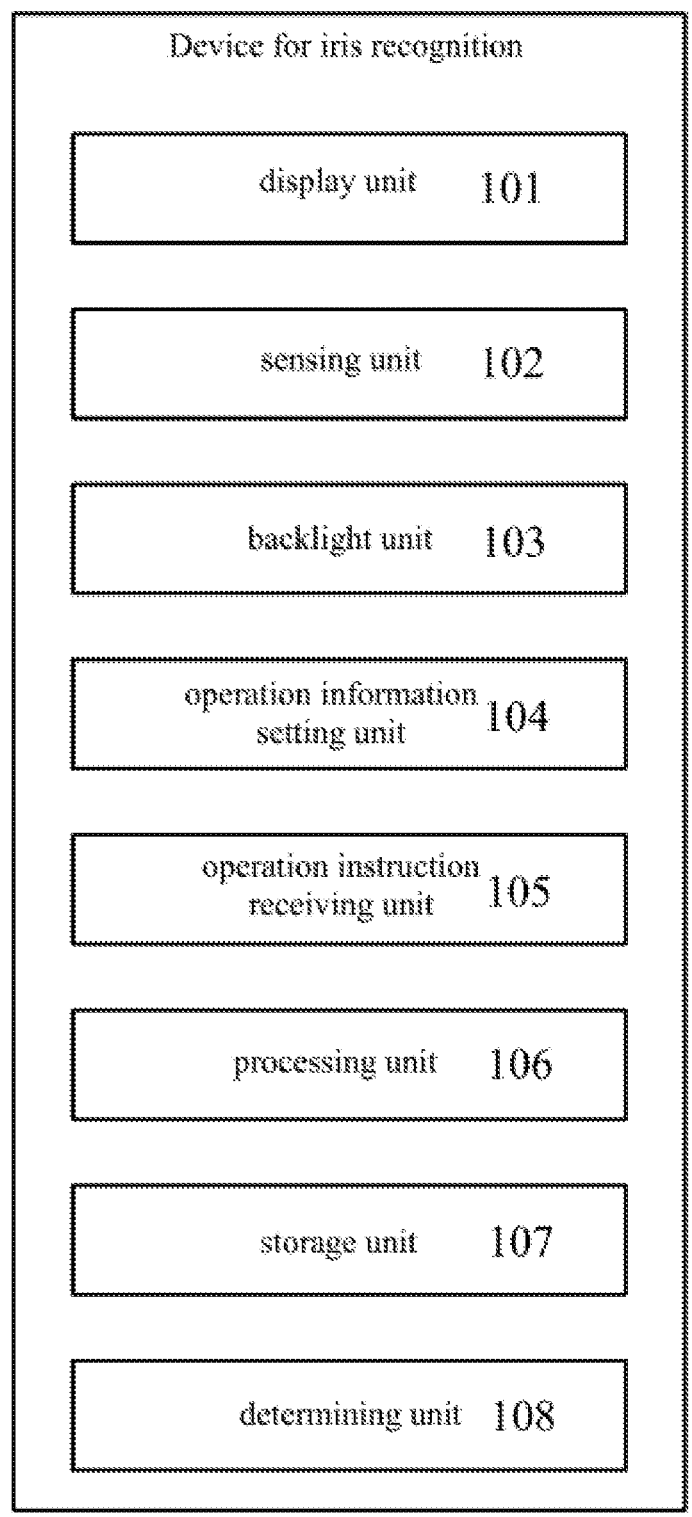
FIG. 3 is a schematic diagram of a device for iris recognition according to an embodiment of the present invention.

As seen from FIG. 3, it is a schematic diagram of a device for iris recognition according to an embodiment of the present invention. The device includes a display unit 101, a sensing unit 102, and an infrared light source; the sensing unit 102 is located under the iris recognition region; the sensing unit 102 includes an infrared sensing layer; the infrared light source is configured for emitting infrared light, and the infrared sensing layer is configured for sensing the infrared light signal reflected by the user's iris and capture the iris information of the user. The device further includes an operation information setting unit 104, a determining unit 108, and a processing unit 106.

The operation information setting unit 104 is configured for presetting operation configuration information, in which the mentioned operation configuration information includes a correspondence between the iris information and the operation instruction. In this embodiment, the operation instruction includes one or more of text operation instructions, image operation instructions, video operation instructions, and application operation instructions. The text operation instructions include a selected text instruction, a delete text instruction, a copy text instruction, and the like; the image operation instructions include a selected image instruction, a copy image instruction, a cut image instruction, an image deletion instruction, a switching image screen, and the like; the video operation instruction includes intercepting, pausing, saving, deleting, fast forwarding, rewinding, zooming, and volume adjustment, and the like; the application operation instructions include starting, deleting, selecting, moving, and the like of the software application (such as a mobile phone APP).

The iris information in the operation configuration information is the iris information that the user inputted and stored in advance, and each iris information can be matched with a plurality of operation instructions, so that after the captured iris information of the user is authenticated, the user can perform multiple operations on the device. The operation configuration information may be stored in a storage unit 107 of the device, such as a memory of the mobile phone or a hard disk of the computer, and may also be stored in the storage unit of a server. When the operation configuration information needs to be captured, the device only needs to establish a communication connection with the server and then captures the prestored operation configuration information from the server. The communication connection includes a wired communication connection or a wireless communication connection.

The sensing unit 102 is configured for capturing the iris information of the user on the iris recognition region. In this embodiment, the coverage of the sensing unit is matched to the size of the display unit. Preferably, the shape of the sensing unit is a rectangle, and the size of the rectangle is located at the center of the display unit, so as to ensure that the sensing unit is not deviated from the optical axis of the eyeball activity image. This ensures that as long as the user's eyes focus on the display unit, the sensing unit can accurately collect the user's iris information in time, no matter how the user's eyeball moves.

The determining unit 108 is configured for determining whether the captured iris information is successfully matched with the preset iris information in the operation configuration information, and if yes the processing unit 106 is configured for executing the operation instruction corresponding to the iris information, otherwise the processing unit 106 does not execute the operation instruction. Comparison of the iris information may be implemented by an iris feature recognition algorithm, which may be stored in the storage unit of the device. A processor of the device will take the iris feature recognition algorithms in the storage unit after the sensing unit captures the iris information on the iris recognition region, and compare the captured iris information with the preset iris information in the operation configuration information to determine whether the two are matched. The iris feature recognition algorithms include steps of iris feature preprocessing, data feature extraction, feature matching, iris recognition, etc., and may be implemented by various algorithms. These algorithms are mature existing arts, have been applied to various encryption and decryption fields, and are no longer repeated herein.

In some embodiments, the device includes an operation instruction receiving unit 105. "The operation information setting unit is configured for presetting operation configuration information" includes: the operation instruction receiving unit is configured for receiving a setting instruction of the user, and the display unit is configured for displaying the iris recognition region. The setting instruction may be triggered by clicking on a button in a setting column on the screen by the user. The device will display the iris recognition region after receiving the setting instruction so that the user can input the iris information. In the present embodiment, the step of displaying the iris recognition region may include: the brightness of the iris recognition region is enhanced or a prompt input box is displayed on the iris recognition region. In some embodiments, receiving account information of the user is necessary before receiving the setting instruction of the user, wherein the account information includes a user ID and a password. The setting instruction can be triggered only after the user inputs the correct user ID and password by voice control, eye control, or key password control to login a user account, so that the operation configuration information setting security can be improved on one hand, and an effect that different users can be distinguished and different iris information and the corresponding operation instruction can be saved on one device can be achieved on the other hand.

The sensing unit is configured for capturing and saving the iris information of the user. The captured iris information is preset iris information, which can be stored in the storage unit. In this embodiment, the step of "capturing and saving the iris information of the user on the eyeball recognition region" includes: determining whether the iris information in the user setting process has been saved in the storage unit, and prompting the user the iris information has been saved when the determination is yes; the iris information is saved to the storage unit when the determination is no. This can effectively avoid repeated storage of iris information.

The display unit is configured for displaying an operation instruction identification list, the operation instruction receiving unit is configured for receiving a selected instruction of the operation instruction identification by the user, and the processing unit is configured for establishing a correspondence between the operation instruction corresponding to the selected operation instruction identification and the captured iris information of the user, and saving it to the operation configuration information. The operation instruction identification list includes one or more identifications corresponding to operation instructions, and each operation instruction identification corresponds to an operation instruction, and the operation instruction identification may be displayed in the form of a text or a picture. The selected instruction can be triggered by the user clicking a check, double clicking, or the like.

In some embodiments, the operation instruction is a screen switching instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes: the determining unit is configured for determining whether the captured iris information of the user matches the iris information corresponding to the screen switching instruction, and if yes the processing unit switches the screen; otherwise the processing unit does not switch the screen. Since the video stream data is composed of a plurality of frames of image screens, the method of the embodiment is also applicable to determine the video stream data.

In some embodiments, the operation instruction is a payment instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes: the determining unit is configured for determining whether the captured iris information matches the iris information corresponding to the payment instruction, and if yes the processing unit executes the payment instruction and the payment is successful, otherwise the processing unit does not execute the payment instruction and the payment is failed. Linking the payment instruction with the user's iris information recognition can effectively enhance the security of the transaction payment, and avoid the owner's unnecessary losses caused by other users' maloperations.

In some embodiments, the operation instruction is a user identity information login instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes: the determining unit is configured for determining whether the captured iris information matches the iris information corresponding to the screen switching instruction. If yes the processing unit executes the payment instruction and the user identity information is successfully logged in, otherwise the processing unit does not execute the payment instruction and the user identity information fails to be logged in. Linking the user identity information to the user's iris information recognition can effectively enhance the security of the user identity login process.

In some embodiments, the sensing unit includes the TFT image sensor array thin-film, the infrared sensing layer includes an array formed by infrared photodiodes and infrared photosensitive transistors. "the determining unit is configured for determining whether the captured iris information is successfully matched with the presetting iris information in the operation configuration information" specifically includes: the determining unit is configured for calculating the feature value according to the captured iris information of the user, and compared with the feature value of the iris information presetting in the configuration information; when the error is less than the presetting value, it is determined to be matched, otherwise it is determined as a mismatch.

In some embodiments, the processing unit is configured for issuing a prompt information when it is determined that there is no iris information in the operation configuration information matching the captured iris information. The prompt information includes one or more of sound prompt information, image prompt information, light prompt information, and video prompt information. The sound prompt information includes voice prompt information prompting the user that the iris recognition is failed, the image prompt information includes popup prompt information prompting the user that the iris recognition is failed, and the video prompt information includes the prompt information prompting the user that the iris recognition is failed. The light prompt information includes changing the brightness of the screen or letting the display screen emit light of different colors.

In some embodiments, the display unit is the LCD screen, a backlight unit 103 is further arranged under the sensing units; and the sensing units are arranged between the backlight unit and the LCD screen. Since the LCD screen is not a self-illuminating component, the backlight unit needs to be added under the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component.

By setting the above two solutions, production requirements of different manufacturers can be effectively met; and an application range of the device can be expanded.

The invention has the following advantages: by providing a sensing unit under the iris recognition region of the display unit, the projection of the user's iris image formed through the optical device is located on the iris recognition region, and the sensing unit is disposed at or near optical axis of the eyeball image. Compared with the structure in which the camera is disposed at the edge position independently of the display screen, the invention can timely capture the user's iris feature information and compare it with the presetting iris information, and execute the operation instruction corresponding to the iris information, thereby effectively improving the user experience. In addition, the sensing unit is disposed under the display unit, and the overall thickness of the mobile device can be effectively reduced compared with the structure in which the camera is protruded and disposed independently outside the region of the display screen, so that the wearable device or the mobile device is thinner and more suitable for flexible wearable devices or mobile devices, to meet the needs of the market.

It should be noted that, in this context, relationship terms such as first and second are used merely to distinguish one entity or operation from another entity or operation, and do not necessarily require or imply any such actual relationship or order between those entities or operations. Furthermore, the terms "include/comprise" or "contain" or any other variations are intended to encompass a non-exclusive inclusion, such that a process, method, object, or terminal device that includes a plurality of elements includes not only those elements but also other elements not explicitly listed, or includes elements inherent to such a process, method, object, or terminal device. Without further limitation, the elements defined by the sentence "including/comprising . . . " or "containing . . . " do not exclude the existence of additional elements in the process, method, object or terminal device including the elements. In addition, in this context, "greater than", "less than", "exceeds", etc. shall be construed to exclude the figure; and "above", "below", "inside", etc. shall be construed to include the figure.

Those skilled in the art shall understand that the various embodiments described above can be provided as a method, a device, or a computer program product. These embodiments may take the form of an entirely hardware embodiment, an entirely software embodiment, or a combination of software and hardware aspects. All or part of the steps in the method involved in the foregoing embodiments may be completed by instructing relevant hardware by a program, and the program may be stored in a storage medium readable by a computer device for executing all or part of the steps in the method of the foregoing embodiments. The computer device includes, but is not limited to, a personal computer, a server, a general purpose computer, a special purpose computer, a network device, an embedded device, a programmable device, a smart mobile terminal, a smart household device, a wearable smart device, a vehicle-mounted smart device, etc. The storage medium includes, but is not limited to, a RAM, a ROM, a magnetic disk, a magnetic tape, an optical disk, a flash memory, a USB flash drive, a mobile hard disk, a memory card, a memory stick, a network server storage, a network cloud storage, etc.

The above embodiments are described with reference to process flow diagrams and/or block diagrams of methods, devices (systems), and computer program products according to the embodiments. It shall be understood that each process and/or block in the process flow diagram and/or block diagram and the combination of process and/or block in the process flow diagram and/or block diagram can be realized by computer program instructions. These computer program instructions can be provided to a processor of a computer device to produce a device, such that when the instructions executed by the processor of the computer device, a device for implementing the functions specified in one or more processes in a process flow diagram and/or one or more blocks in a block diagram is produced.

These computer program instructions can also be stored in a computer device readable memory that can direct guide the computer device to operate in a particular manner, thereby enabling the instructions stored in the computer device readable memory to produce a manufacture including an instruction device, and the instruction device implements the functions specified in one or more processes in a process flow diagram and/or one or more blocks in a block diagram.

These computer program instructions can also be loaded onto a computer device, enabling a series of operating steps to be executed on the computer device to produce computer-implemented processing, and thus the instructions executed on the computer device provide steps for implementing the functions specified in one or more processes in a process flow diagram and/or one or more blocks in a block diagram.

Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. A method for iris recognition, characterized in that, the method is applied to a device for iris recognition, the device comprising a display unit, a sensing unit, and an infrared light source; the display unit is provided with an iris recognition region, the sensing unit is located under the iris recognition region; the sensing unit includes an infrared sensing layer; the infrared light source is configured for emitting infrared light, and the infrared sensing layer is configured for sensing the infrared light signal reflected by an user's iris and capture iris information of the user; the method includes the following steps:

presetting operation configuration information, wherein the operation configuration information includes a correspondence between iris information and an operation instruction;

capturing the iris information of the user's iris recognition region, determining whether the captured iris information is successfully matched with the presetting iris information in the operation configuration information, and if yes executing the operation instruction corresponding to the iris information in the operation configuration information, otherwise not executing the operation instruction.

2. The method for iris recognition according to claim 1, characterized in that, the step of "presetting operation configuration information" comprises:

receiving a setting instruction of the user and displaying the iris recognition region;

capturing and saving the iris information of the user;

displaying an operation instruction identification list, The operation instruction identification list includes one or more identifications corresponding to operation instructions, and each operation instruction identification corresponding to an operation instruction;

receiving a selected instruction of the operation instruction identification by the user, and establishing a correspondence between the operation instruction corresponding to the selected operation instruction identification and the captured iris information of the user, and saving the correspondence to the operation configuration information.

3. The method for iris recognition according to claim 1, characterized in that, the operation instruction is a screen switching instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information of the user matches the iris information corresponding to the screen switching instruction, and if yes, switching the screen; otherwise, the screen is not switched.

4. The method for iris recognition according to claim 1, characterized in that, the operation instruction is a payment instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information matches the iris information corresponding to the payment instruction, and if yes the payment is successful, otherwise the payment is failed.

5. The method for iris recognition according to claim 1, characterized in that, the operation instruction is a user identity information login instruction, and the step of "determining whether the captured iris information is successfully matched with the presetting iris information in the operation configuration information, and if yes executing the operation instruction corresponding to the iris information in the operation configuration information, otherwise not executing the operation instruction" includes:

determining whether the captured iris information matches the iris information corresponding to the screen switching instruction, if yes the user identity information is successfully logged in, otherwise the user identity information fails to be logged in.

6. The method for iris recognition according to claim 1, characterized in that, the sensing unit includes a TFT image sensor array thin-film, the infrared sensing layer includes an array formed by infrared photodiodes and infrared photosensitive transistors.

7. The method for iris recognition according to claim 1, characterized in that, the step of "determining whether the captured iris information is successfully matched with the presetting iris information in the operation configuration information" specifically includes:
calculating a feature value according to the captured iris information of the user, and compared with a feature value of the iris information presetting in the configuration information; when the error is less than the presetting value, it is determined to be matched, otherwise it is determined as a mismatch.

8. The method for iris recognition according to claim 1, characterized in that, the method further includes the step of:
issuing a prompt information when it is determined that there is no iris information in the operation configuration information matching the captured iris information.

9. The method for iris recognition according to claim 1, characterized in that, the iris recognition region includes a plurality of iris recognition sub-regions, and a sensing unit is disposed corresponding to each of the iris recognition sub-regions.

10. The method for iris recognition according to claim 9, characterized in that, the device further includes a sensing unit control circuit, the method further includes:
receiving a start instruction of the user for the iris recognition sub-region, the sensing unit control circuit turning on the sensing unit under the iris recognition sub-region, and receiving a closing instruction of the user for the iris recognition sub-region, the sensing unit control circuit turning off the sensing unit under the iris recognition sub-region.

11. A device for iris recognition, characterized in that, the device comprising a display unit, a sensing unit, and an infrared light source; the display unit is provided with an iris recognition region, the sensing unit is located under the iris recognition region; the sensing unit includes an infrared sensing layer; the infrared light source is configured for emitting infrared light, and the infrared sensing layer is configured for sensing the infrared light signal reflected by an user's iris and capture iris information of the user; the device further includes an operation information setting unit, a determination unit, and a processing unit;
the operation information setting unit is configured for presetting operation configuration information, the operation configuration information includes a correspondence between the iris information and the operation instruction;
the sensing unit is configured for capturing the iris information of the user on the iris recognition region, the determination unit is configured for determining whether the captured iris information is successfully matched with the presetting iris information in the operation configuration information, and if yes the processing unit executes the operation instruction corresponding to the iris information, otherwise the processing unit does not execute the operation instruction.

12. The device for iris recognition according to claim 11, characterized in that, the device further includes an operation instruction receiving unit, "the operation information setting unit is configured for presetting operation configuration information" includes:
the operation instruction receiving unit is configured for receiving a setting instruction of the user and the display unit is configured for displaying the iris recognition region;
the sensing unit is configured for capturing and saving the iris information of the user on the eyeball recognition region;
the display unit is configured for displaying an operation instruction identification list, the operation instruction identification list including one or more identifications corresponding to operation instructions, and each operation instruction identification corresponding to an operation instruction;
the operation instruction receiving unit is further configured for receiving a selected instruction of the operation instruction identification by the user, the processing unit is configured for establishing a correspondence between the operation instruction corresponding to the selected operation instruction identification and the captured iris information of the user, and saving the correspondence to the operation configuration information.

13. The device for iris recognition according to claim 11, characterized in that, the operation instruction is a screen switching instruction, and "the determination unit is configured for determining whether the captured iris information is successfully matched with the presetting iris information in the operation configuration information, and if yes executing the operation instruction corresponding to the iris information, otherwise not executing the operation instruction" includes:
the determination unit is configured for determining whether the captured iris information of the user matches the iris information corresponding to the screen switching instruction, and if yes the determination unit switches the screen; otherwise the determination unit does not switch the screen.

14. The device for iris recognition according to claim 11, characterized in that, the operation instruction is a payment instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes:
the determining unit is configured for determining whether the captured iris information matches the iris information corresponding to the payment instruction, and if yes the processing unit executes the payment instruction and the payment is successful, otherwise the processing unit does not execute the payment instruction and the payment is failed.

15. The device for iris recognition according to claim 11, characterized in that, the operation instruction is a user identity information login instruction; "the determining unit is configured for determining whether the captured iris information is successfully matched with the presetting iris information in the operation configuration information, and if yes the processing unit is configured for executing the operation instruction corresponding to the iris information, otherwise the processing unit does not execute the operation instruction" includes:

the determining unit is configured for determining whether the captured iris information matches the iris information corresponding to the screen switching instruction, if yes the processing unit executes the user identity information login instruction and the user identity information is successfully logged in, otherwise the processing unit does not execute the user identity information login instruction and the user identity information fails to be logged in.

16. The device for iris recognition according to claim 11, characterized in that, the sensing unit includes a TFT image sensor array thin-film, the infrared sensing layer includes an array formed by infrared photodiodes and infrared photosensitive transistors.

17. The device for iris recognition according to claim 11, characterized in that, "the determination unit is configured for determining whether the captured iris information is successfully matched with the presetting iris information in the operation configuration information" specifically includes:

the determining unit is configured for calculating the feature value according to the captured iris information of the user, and compared with the feature value of the iris information presetting in the configuration information; when the error is less than the presetting value, it is determined to be matched, otherwise it is determined as a mismatch.

18. The device for iris recognition according to claim 11, characterized in that, the display unit is the LCD screen, a backlight unit is further arranged under the sensing units; and the sensing units are arranged between the backlight unit and the LCD screen.

19. The device for iris recognition according to claim 11, characterized in that, the iris recognition region includes a plurality of iris recognition sub-regions, and a sensing unit is disposed corresponding to each of the iris recognition sub-regions.

20. The device for iris recognition according to claim 19, characterized in that, the device further includes a sensing unit control circuit and an operation instruction receiving unit, the operation instruction receiving unit is configured for receiving a start instruction of the user for the iris recognition sub-region, the sensing unit control circuit is configured for turning on the sensing unit under the iris recognition sub-region, and the operation instruction receiving unit is configured for receiving a closing instruction of the user for the iris recognition sub-region, the sensing unit control circuit is configured for turning off the sensing unit under the iris recognition sub-region.

* * * * *